United States Patent [19]
Eda et al.

[11] Patent Number: 5,137,423
[45] Date of Patent: Aug. 11, 1992

[54] HYDRAULIC TURBINE

[75] Inventors: Takeichi Eda, No.989, Kamihinata, Kanuma-shi, Tochigi-ken; Hiroshi Eda, Kanuma, both of Japan

[73] Assignee: Takeichi Eda, Kanuma, Japan

[21] Appl. No.: 753,597

[22] Filed: Sep. 3, 1991

[30] Foreign Application Priority Data

Sep. 3, 1990 [JP] Japan .................... 2-230502

[51] Int. Cl.⁵ .................................. F01D 1/02
[52] U.S. Cl. ........................... 415/202; 415/8; 417/437
[58] Field of Search ............. 415/5, 6, 7, 8, 2.1, 415/3.1, 905, 906, 202; 417/68, 69, 437, 460, 461, 320

[56] References Cited

U.S. PATENT DOCUMENTS

| | | | |
|---|---|---|---|
| 810,066 | 1/1906 | Maguin | 415/6 |
| 1,320,216 | 10/1919 | Fisher | 417/68 |
| 4,611,970 | 9/1986 | McLaughlin | 415/6 |

FOREIGN PATENT DOCUMENTS

0283730A1 9/1988 European Pat. Off.

*Primary Examiner*—Edward K. Look
*Assistant Examiner*—Mark Sgantzos
*Attorney, Agent, or Firm*—Armstrong, Nikaido, Marmelstein, Kubovcik & Murray

[57] ABSTRACT

A hydraulic turbine comprises a rotatably supported circular body, a plurality of vanes radially provided in a circumference of the circular body. A water-permeable perforated plate is arranged to extend over an external periphery of the vanes to form a plurality of enclosed chambers in the circumference of the circular body. An elastic bag is contained in each of the chambers. The bags are filled with an appropriate pressure of air. A receptacle having a circular bottom portion rotatably receives therein a bottom portion of the circular body in an enclosing manner. The receptacle is provided with an inlet port and an outlet port to take in and discharge water, respectively.

2 Claims, 1 Drawing Sheet

HYDRAULIC TURBINE

BACKGROUND OF THE INVENTION

This invention relates to a hydraulic turbine which utilizes hydraulic power as a driving power source.

Conventionally, a hydraulic turbine which utilizes running water or falling water as a driving power source is well known.

Since this kind of conventional hydraulic turbine only utilizes hydraulic pressure, it has an advantage in that the natural power can be effectively utilized and that its construction is simple. However, it has a disadvantage in that a sufficient power cannot be obtained.

SUMMARY OF THE INVENTION

In view of the above-described problems, this invention has an object of improving the rotating function of the hydraulic turbine by utilizing a pneumatic power, aside from the conventional hydraulic power.

In order to attain the above-described object, this invention provides a hydraulic turbine which is characterized by a rotatably supported circular body; a plurality of vanes radially provided in a circumference of the circular body; a water-permeable perforated plate arranged to extend over an external periphery of the vanes, thereby forming a plurality of enclosed chambers in the circumference of the circular body; elastic bag means contained in each of the chambers, the bag means being filled with an appropriate pressure of air; and receptacle means having a circular bottom portion to rotatably receive therein a bottom portion of the circular body in an enclosing manner, the receptacle means having on both sides thereof in the rotational direction of the circular body an inlet port and an outlet port to take in and discharge water, respectively.

In one preferred embodiment, the outlet port is positioned in a level higher than that of the inlet port.

In the hydraulic turbine according to this invention, as shown in the drawings of an embodying example, the intake water to be taken in from a water intake 9 towards a hydraulic turbine enters enclosed chambers 4 through a perforated plate 3. The water acts on vanes 2 while compressing, through its hydraulic pressure, elastic bags 5 which are contained in the enclosed chambers 4 against their internal pressures, and thus rotates the hydraulic turbine in a direction as shown by arrows. At the same time, those reaction forces inside the elastic bags 5 which function to expand in the chambers 4 against the hydraulic pressure, operate as upward forces in a half portion from a bearing support line downstream so as to rotate the hydraulic turbine in a direction shown by arrows. Therefore, aside from the force by the hydraulic pressure, the pneumatic force functions as a buoyant force, whereby the rotating function of the hydraulic turbine is remarkably improved.

DETAILED DESCRIPTION OF A PREFERRED EMBODIMENT

Figure 1:
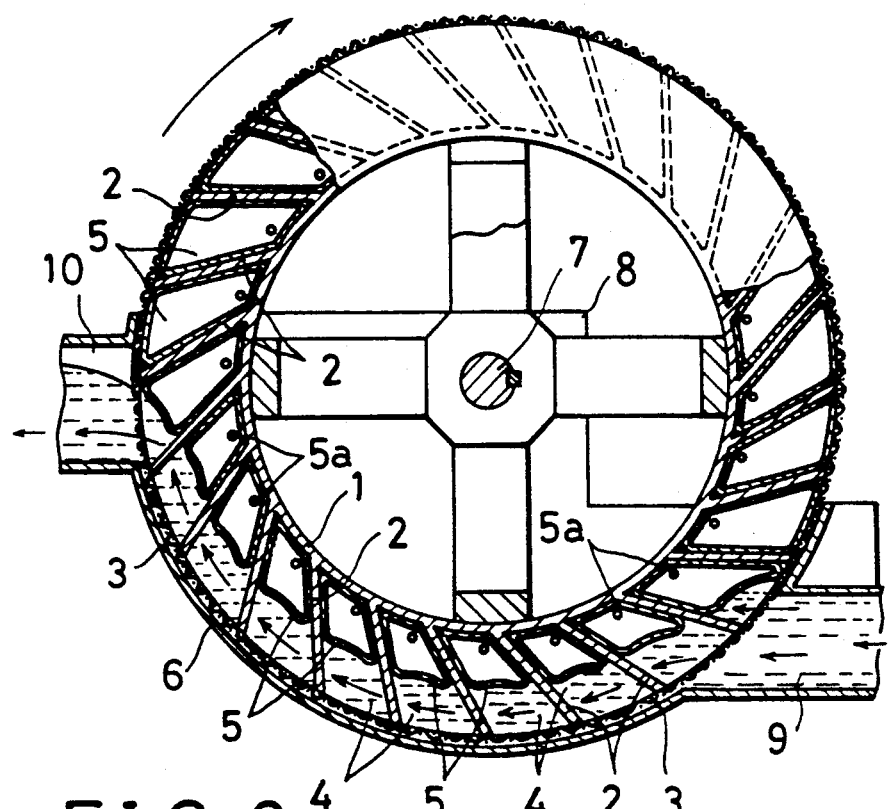
FIG. 1 is a side view, with an important portion shown in section, of an embodying example of this invention hydraulic turbine
Figure 2:
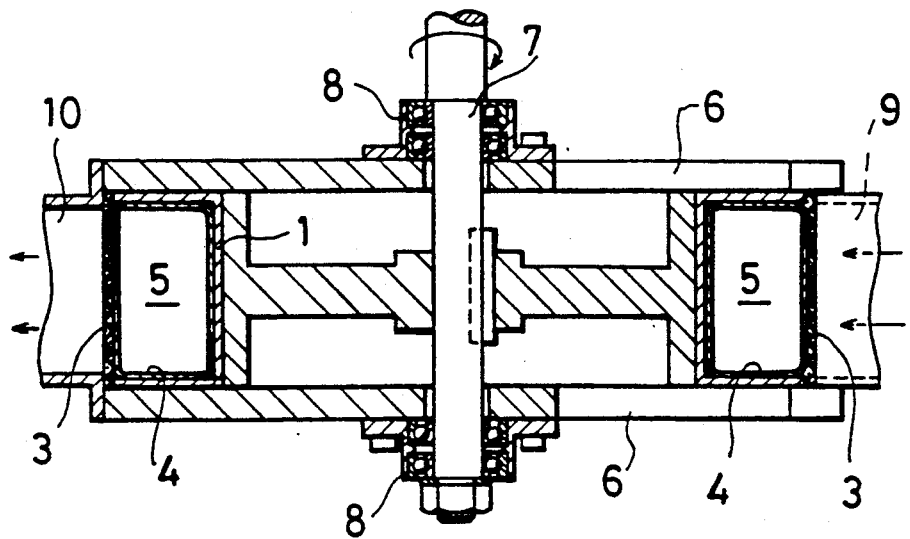
FIG. 2 is a sectional plan view thereof.

An embodying example will now be described with reference to the accompanying drawings.

Referring to the drawings, numeral 1 denotes a circular body comprising an annular portion having a cross section of channel shape. A plurality of vanes 2 are radially provided in a circumference of the circular body 1. An external periphery between the neighboring vanes 2 is closed by a water-permeable perforated plate 3 such as a wire mesh so that a plurality of chambers 4 are formed in the circumference of the circular body 1.

In the illustrated embodiment, each of the vanes 2 is inclined substantially tangentially relative to the circumference of the circular body 1 so that they can easily be subjected to hydraulic pressure.

In each of the chambers 4 to be formed between the vanes 2, there is contained an elastic bag 5 made of an elastic material such as rubber or the like. These elastic bags 5 are filled with air to attain an appropriate pressure. Under normal conditions, these bags are arranged to be kept in an inflated condition. Numeral 5a denotes a valve for filling or discharging air into and out of each elastic bag 5.

The hydraulic turbine which contains the elastic bags 5 inside the chambers 4 between the vanes 2 is rotatably supported by a shaft 7 at a stationary bearing portion 8 such that the periphery of the hydraulic turbine rotates inside a receptacle tank 6 along a circular bottom surface of the tank. The shaft 7 which rotates together with the hydraulic turbine is defined to be an output shaft for performing work.

The receptacle tank 6 is provided, on one side of the rotational direction of the hydraulic turbine, with a water intake port 9 and a water outlet port 10 on the other side thereof so that the water intake port 9 can be connected to a suitable water supply source to discharge water under pressure from the water inlet port 9.

In the above-described constitution, the water from the water intake port 9 is caused to act on the hydraulic turbine. While the elastic bags 5 inside the chambers 4 between the vanes 2 are compressed by hydraulic pressure, the vanes 2 are urged to rotate the hydraulic turbine and, at the same time, the buoyant forces due to the restoring force of the air inside the bags 5 which are compressed by the hydraulic pressure, is caused to act as a rotational force on the downstream half of the hydraulic turbine. In this manner, both the hydraulic pressure and the pneumatic pressure can be used as the rotating forces.

According to this invention, since the hydraulic pressure to act on the vanes and the restoring force, i.e., the pneumatic force, against the compression of the elastic bags which are contained inside the chambers formed between the vanes are both used in combination as the rotational driving force of the hydraulic turbine, there is an advantage in that, as compared with the conventional hydraulic turbine to be operated only by the hydraulic pressure, this system is economical because a far larger rotational power force can be obtained with a very simple construction and a small amount of operational costs.

It is readily apparent that the above-described invention has the advantage of wide commercial utility. It should be understood that the specific form of the invention hereinabove described is intended to be representative only, as certain modification within the scope of these teachings will be apparent to those skilled in the art.

Accordingly, reference should be made to the following claims in determining the full scope of the invention.

What is claimed is:

1. A hydraulic turbine comprising:
a rotatably supported circular body;
a plurality of vanes radially provided in a circumference of said circular body;
a water-permeable perforated plate arranged to extend over an external periphery of said vanes, thereby forming a plurality of enclosed chambers in the circumference of said circular body;
elastic bag means contained in each of said chambers, said bag means being filled with pressurized air; and
receptacle means having a circular bottom portion to rotatably receive therein a bottom portion of said circular body in an enclosing manner, said receptacle means having on both sides thereof in the rotational direction of the circular body an inlet port and an outlet port to take in and discharge water, respectively.

2. A hydraulic turbine according to claim 1, wherein said outlet port is positioned on a level higher than that of said inlet port.

* * * * *